Jan. 1, 1957  F. L. TURBETT  2,776,198
PREPARATION OF PHOSPHATE FERTILIZER
AND ANIMAL FEED SUPPLEMENT
Filed July 28, 1953
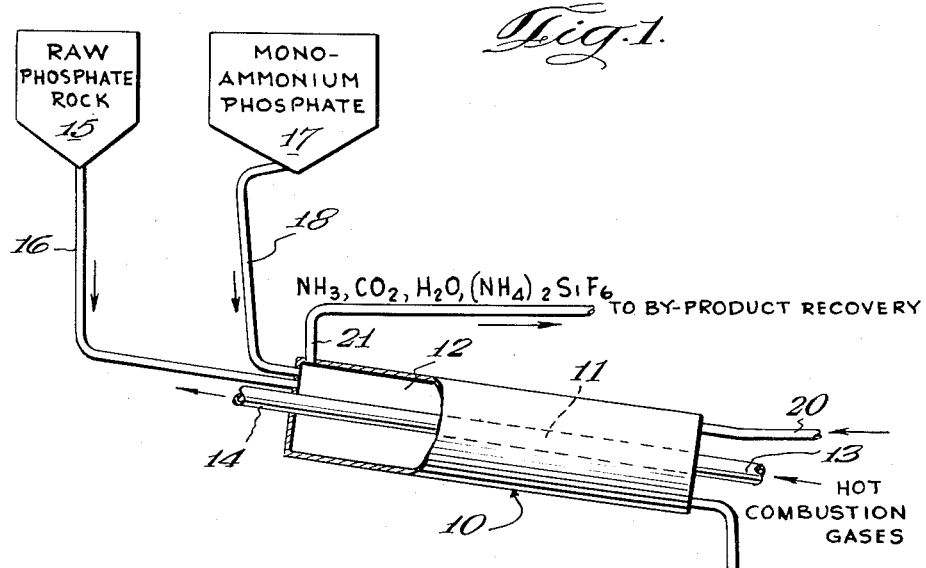
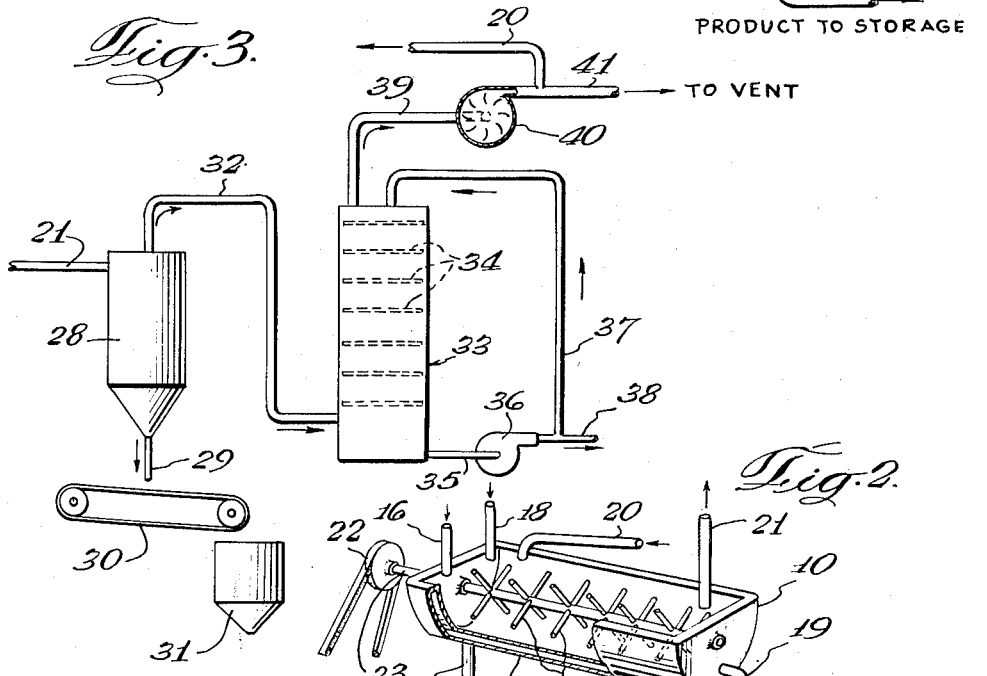
Inventor
Forrest L. Turbett
By Schroeder, Merriam, Hofgren & Brady
Attorneys

United States Patent Office 2,776,198
Patented Jan. 1, 1957

2,776,198

PREPARATION OF PHOSPHATE FERTILIZER AND ANIMAL FEED SUPPLEMENT

Forrest L. Turbett, Joplin, Mo., assignor to Spencer Chemical Company, a corporation of Missouri Application July 28, 1953, Serial No. 370,735

2 Claims. (Cl. 71—36)

This invention relates to processes for producing material containing citrate soluble and water soluble phosphates as well as nitrogen compounds in a form fully available to plant and animal life.

It is well known that the portion of phosphorus contained in any fertilizer which is soluble in neutral ammonium citrate is readily available to plant life. The portion which is not citrate soluble (tricalcium phosphate, fluorapatite, hydroxyapatite, etc.) is not readily available to plant life and is therefore of questionable value as a fertilizer material.

By the process of this invention the phosphate content of citrate insoluble phosphate materials is rendered substantially completely citrate soluble or water soluble, or both, with the simultaneous introduction into the materials of a substantial quantity of ammoniacal nitrogen if desired. The insoluble raw phosphate materials may include among others (1) raw phosphate rocks such as those found in Florida and Wyoming commonly called fluorapatites, (2) raw phosphate rocks commonly called chlorapatites, (3) aluminum and iron phosphates, and (4) fused, calcined, or otherwise heat modified phosphatic materials.

This invention provides a simple, single step process which is more economical than any other process yet available for the production of similarly useful fertilizer products and animal feed supplements.

The materials produced with the method of this invention contain a substantial quantity of phosphates quickly soluble in water. These are thus available to plants requiring a large amount of phosphorus in the early stages of their growth.

The remaining phosphates in the materials produced by this invention are largely water soluble, but because of their glass-like physical structures are dissolved more slowly. Because of the latter fact, they are more slowly leached from the soil than is the widely used fertilizer triple superphosphate—whether or not ammoniated—and are substantially completely available to long season plant crops.

The process of this invention produces a fertilizer product having a total plant food content higher than that of any other fertilizer material now commercially available. For example, the above mentioned triple superphosphate, as sold commercially, usually has an N—$P_2O_5$—$K_2O$ content (hereafter referred to as NPK ratio) of 0—46—0. If ammoniated to 12% nitrogen content, it has an NPK ratio of 12—38—0. The preferred products of this invention, however, range in NPK ratio from 5—50—0 to 5—70—0. Since the total food plant content of a fertilizer product is represented by the sum of these figures, it is seen that the products of this invention are far superior in plant food content to triple superphosphate, even in its ammoniated form. Furthermore, the products of this invention can be additionally ammoniated if desired and the nitrogen content further increased, with the $P_2O_5$ content decreased proportionately.

Besides their great value as plant fertilizer products, the materials produced with the method of this invention are especially well suited for use as animal feed supplements, because of their almost complete freedom from harmful fluorine compounds even when prepared from raw materials containing this element.

In addition to the above advantages, this invention also produces valuable by-products in the form of ammonium fluosilicates and aqua ammonia.

*Trend in plant food content of fertilizers.*—The trend in the fertilizer industry through the years has been toward the production of fertilizers of higher and higher plant food content. The following table[1] published by the U. S. Department of Agriculture clearly illustrates this trend (data in short tons for United States and territories):

| Year Ending June 30 | Nitrogen | Plant Nutrients Available $P_2O_5$ | Consumed $K_2O$ | Total | Fertilizer Consumption | Percent Plant Nutrients |
|---|---|---|---|---|---|---|
| 1952 | 1,424,780 | 2,199,376 | 1,581,467 | 5,205,623 | 22,432,418 | 23.2 |
| 1951 | 1,236,977 | 2,109,900 | 1,379,813 | 4,726,690 | 20,991,394 | 22.5 |
| 1950 | 1,005,452 | 1,949,768 | 1,103,062 | 4,058,282 | 18,433,300 | 22.1 |
| 1949 | 919,946 | 1,941,709 | 1,073,073 | 3,934,728 | 18,541,885 | 21.2 |
| 1948 | 856,719 | 1,853,639 | 920,725 | 3,631,083 | 17,818,401 | 20.4 |
| 1947 | 784,000 | 1,736,000 | 858,000 | 3,378,000 | 16,838,652 | 20.1 |
| 1946 | 701,000 | 1,553,000 | 807,000 | 3,061,000 | 15,027,679 | 20.4 |
| 1945 | 630,000 | 1,354,000 | 729,000 | 2,713,000 | 13,981,000 | 19.4 |
| 1944 | 640,000 | 1,408,000 | 649,000 | 2,697,000 | 13,330,000 | 20.2 |
| 1943 | 509,000 | 1,237,000 | 643,000 | 2,389,000 | 11,734,000 | 20.4 |
| 1940 | 419,000 | 912,000 | 435,000 | 1,766,000 | 8,656,000 | 20.4 |
| 1935–39 average | 371,000 | 719,000 | 375,000 | 1,465,000 | 7,588,000 | 19.3 |
| 1930 | 377,000 | 793,000 | 354,000 | 1,524,000 | 8,425,000 | 18.1 |
| 1920[2] | 228,000 | 660,000 | 257,000 | 1,145,000 | 7,296,000 | 15.7 |
| 1910[2] | 146,000 | 499,000 | 211,000 | 856,000 | 5,547,000 | 15.4 |
| 1900[2] | 62,000 | 246,000 | 87,000 | 395,000 | 2,730,000 | 14.5 |

[1] Source: Bureau of Plant Industry, U. S. Department of Agriculture.
[2] Calendar year.

Some of the factors influencing this trend have been increased farm mechanization and decreased availability of farm labor as the steady transfer of population to urban centers has continued.

Increased plant food content in fertilizers has been helpful in increasing crop yields for a given capital investment, and has resulted in lower labor and operating costs per unit of plant food. Among other things, it has decreased fertilizer bagging costs, storage costs, shipping charges, and other distribution costs. Last but not least, it has reduced the farmer's physical labor for a given rate of fertilizer application.

*Method of classifying plant food content.*—The trend toward higher plant food content in fertilizers has introduced into the industry—for use in identifying total plant food content—the loosely descriptive phrase "high analysis." To some this means anything higher than 4—8—4 NPK ratio. (See above for definition of "NPK ratio.") To others it implies a total plant food content of 30% or more, e. g., a 10—10—10 or 12—12—12 NPK ratio.

For clarity, it is simpler to divide total plant food content into units of ten and to refer to these categories as "40 plus," "50 plus," "70 plus," etc. (including therein the lower boundary of the category). Under this system, triple superphosphate as usually sold commercially (having an NPK ratio of 0—46—0) is a "40 plus" material. Commercial "Ammophos" (discussed below) has an NPK ratio of about 12—48—0 and is thus a "60 plus" material.

*Available high plant food content fertilizers.*—Triple superphosphate, as stated above, is a widely used fertilizer usually having an NPK ratio of 0—46—0.

Since the advent of triple superphosphate, there has been only one significant product introduced into the fertilizer market. This is "Ammophos," which consists primarily of monoammonium phosphate. The NPK ratio of this product is about 12—48—0. (As this commercial product contains some sulfate, its NPK ratio is lower than that of pure monoammonium phosphate, which would run about 12—61—0.)

*Commercial importance of present invention.*—It is seen that in the "50 plus" category and higher only one phosphorus product of any commercial importance exists in the fertilizer industry. In view of the trend toward higher total plant food content in fertilizers, the importance of any new commercially competitive process for producing "50 plus" materials or better is at once apparent.

The process of this invention yields products in the range of "50 plus" to "70 plus." These products are further capable of substantial modification—as by ammoniation for blending with potash materials—to produce a variety of fertilizer complexes all in the "50 plus" to "70 plus" range.

*Other processes.*—In the past ten years several new processes have been developed to produce fertilizer materials in the "30 plus" and "40 plus" range.

All of these new processes, as well as that producing commercial "Ammophos," use sulfuric or nitric acids or a mixture of both. Special alloys and complex acidulation steps are required which increase the capital investment.

Moreover, nitric acid is expensive to manufacture and difficult to transport. Sulfuric acid is relatively cheap, but requires scarce sulfur. Furthermore, in the form of calcium sulfate it has no value as a plant food, and acts as a diluent to limit the total plant food content attainable.

*Advantages of present invention.*—It is thus readily apparent that to produce "50 plus" materials or higher it is necessary to eliminate the use of sulfuric acid. From the standpoint of hygroscopicity and cost it is also desirable to eliminate the use of nitric acid. It is further desirable to use the simplest processing steps possible to lower both capital investment and operating costs. This invention fully accomplishes all these aims in a simple one step process suited to continuous or batch operation on any desirable scale.

The products of this invention are characterized by their low pH values of 1.8 to 2.4 when placed in water. They are thus capable of absorbing a considerable amount of additional ammonia, if higher nitrogen content in the final product is desired.

When produced by a continuous process, the products of this invention are further characterized by their free flowing granular properties. The batch process produces a dry friable mass after baking, which is easily pulverized or granulated. In either case the products are characterized by their relative lack of hygroscopicity.

*Present invention summarized.*—The process of this invention, stated simply, involves the reaction of a phosphatic material with an ammonium phosphate or a monobasic alkali metal phosphate at a temperature in the range of about 200° C. to about 1000° C. at substantially atmospheric pressure. The resultant granular or glassy fused product is cooled and recovered for use directly as a fertilizer or an animal feed supplement, or for use as an intermediate in the production of other fertilizers.

The main reaction product is a complex nitrogen phosphate material. If desired, it may be produced in a form substantially free of nitrogen, if the reaction mass is heated to a high temperature to drive off all the ammonia.

The by-products—consisting of ammonia, carbon dioxide, water and ammonium fluosilicates—are recovered by step-wise condensation as ammonium fluosilicate (substantially anhydrous) and aqua ammonia containing some carbon dioxide (as ammonium carbonate).

This invention may be more specifically illustrated by reference to the drawings. In the drawings:

Figure 1 is a diagrammatic representation of the process of the invention.

Figure 2 shows diagrammatically one of many possible variations of reactor design.

Figure 3 is a diagrammatic outline of a useful by-product recovery system that may be employed with the process of this invention.

*Gas-heated kiln.*—Referring to Figure 1, reactor 10 is an indirect fired kiln which has a central reactor conduit 11, a cylindrical shell 12 closed at both ends, and a reaction chamber (not shown) which revolves about the central axis of the kiln. One end of the reactor is elevated somewhat above the other, so that rotation of the reaction chamber causes the reaction materials to move from the upper to the lower end of the kiln.

Hot combustion gases from any convenient source are led into reactor conduit 11 at its lower end through inlet conduit 13, and out at the other end through outlet conduit 14. This latter conduit leads the gases to a suitable vent (not shown). By this means the products moving through the kiln are heated chiefly by radiant and partially by convective heat.

Raw phosphate rock contained in storage hopper 15 is led through screw conveyor 16 or other suitable feeding equipment into the upper or front end of reactor 10. At the same time, monoammonium phosphate contained in storage hopper 17 is led into the same end of a reactor 10 through screw conveyor 18 or other suitable feeding equipment.

Within reactor 10 the raw rock phosphate and monoammonium phosphate react at a suitable temperature to produce a complex phosphate material, containing a substantial percentage of nitrogen or not as desired.

*Removal of main reaction product.*—As shown in Figure 1, the main reaction product is drawn from the lower or back end of reactor 10 through line 19, collected by means not shown, and led to product storage.

*Removal of by-products.*—The by-products of the reaction may be removed in any of several ways. If desired, simultaneously with the introduction of the raw materials into the reactor, low pressure steam or inert gas such as nitrogen, combustion gases, or vent gases from the process may be introduced through line 20 in small quantities so as to create a slight positive pressure sufficient to create an upward flow of the gaseous products of the reaction. These products may then be removed through line 21 at the front end of the reactor, from whence they go to by-product recovery equipment (not shown in Figure 1).

As an alternative procedure, line 20 may be closed and a slight vacuum established in line 21 by appropriate means (not shown). This removes the by-products and their volume is replaced with small amounts of air leaking in around the various points where lines 16, 18, 19, and 21 enter or leave the reactor, respectively.

However, I prefer to introduce small amounts of vent gas (from a source such as the vent line of Figure 3) through line 20 and at the same time to maintain a slight vacuum on line 21 to facilitate the sweeping action.

*Reaction temperature.*—The reaction temperature employed in the process of this invention will obviously be limited by the particular materials of construction chosen for reactor 10. At the higher temperature limits mentioned above, ceramic materials or even Carborundum refractory materials would be required. However, at the temperature range at which I prefer to operate, about 200° to about 400° C., and even more specifically in the relatively narrower range of about 330° to about 350° C., I have found that stainless steel of the type commercially called "304" is entirely suitable as a material of construction for both the indirect firing tube and the shell and other portions of the reactor which are in contact with the reaction mass or the raw materials.

As is indicated by the examples given below, the reaction of monoammonium phosphate on the raw phosphate rock proceeds from a temperature of about 200° C., which is the melting point of the salt (see Example 2), up to at least 800° C. (see Example 9).

It is also shown by the examples that fluorine removal increases with increase of temperature, and surprisingly enough that citrate insolubles likewise increase or, conversely, citrate solubles decrease (see Example 9). This latter unexpected temperature effect leaves the exact mechanism of this reaction in some doubt. However, it is apparent that defluorinization alone does not necessarily confer citrate solubility, as some persons skilled in the art have previously believed.

As shown by the examples, I have found that the adverse effects of high temperature can be easily avoided by increasing the amount of monoammonium phosphate added and lowering the temperature to the range of about 200° to about 400° C. (see Examples 1 through 8). This also effects a substantial saving in heat input.

*Fluorine removal.*—The process of this invention produces a material which is substantially fluorine free even when the raw phosphate rock used is a type, such as fluorapatite, that contains the element fluorine.

In addition to the effect of increased temperature on fluorine removal noted above, I have found that agitation of the reacting mass helps effect more efficient fluorine and chlorine removal.

I have also found that for effective fluorine removal it is extremely important to remove the gases and vapors continuously, whether they are vented to the atmosphere or to a recovery system.

*Proportions of raw materials.*—With ammonium phosphate to raw phosphate rock ratios below about 1 to 1 by weight, conversion of citrate insoluble to citrate soluble phosphate is reduced. This decreases the useability of the resulting materials as fertilizers, though not necessarily as animal feed supplements. On the other hand, no commensurate economic gain is involved in using ratios of much above about 2.5 to 1 by weight. (See Examples 3 through 6 below.)

The ratio I prefer lies in the range of about 1 to 1 to about 2.5 to 1. The final ratio selected will be dependent upon various factors, including among others (1) cost of phosphate raw material delivered to plant site, (2) analysis of phosphate, (3) cost of monoammonium or other ammonium phosphate delivered, (4) shipping area and volume demand within that area for specific product, (5) sales value of particular product, especially as to low fluorine content, high NPK ratio, etc., and (6) freight rates.

*Organic content.*—The organic matter content of the phosphate raw material acts in two ways on the finished product. First, it serves as a diluent, limiting the total plant food content obtainable from a given material. Second, it affects the color of the reaction product. Low organic matter products are light gray or fawn gray in color, while high organic content give deeper grays down to almost black.

In so far as I have been able to observe, very little if any of the organic matter is decomposed under the preferred conditions of this invention. The carbon dioxide in the off-gases seems to be fully accounted for by the calcium carbonate originally in the raw material.

*Alternative form of reactor.*—The reactor used with this invention may equally appropriately be a broken flight conveyor or paddle mixer such as shown diagrammatically in the partially sectional view of Figure 2. Element 22 is a driven pulley attached to shaft 23, the latter carrying suitable paddles 24 commercially used in this type of equipment. Any suitable source of motive power may be employed to turn the paddle bearing shaft. The paddles are so arranged as to carry the reacting raw materials and reaction products gently but positively through reactor 10 from the point of entrance to the point of exit.

As shown in partial section in Figure 2, jacket or shell 25 surrounds reactor 10, with inlet means 26 and exit means 27 for the circulation of a suitable indirect heating medium. The heating medium may be Dowtherm, Aroclor, high pressure steam, a molten salt solution, molten metals such as sodium or potassium, or any other suitable means for indirectly providing the heat required in the reactor.

Elements 16 and 18 in Figure 2 are raw material lines such as previously described, 20 and 21 respectively are purge gas and by-product lines such as previously described, and 19 is the product line to storage. Reactor 10 is provided with a suitable cover (not shown) to keep the reaction chamber substantially air tight.

I have found that the agitation of the reaction mass produced by this kind of reactor not only gives more efficient fluorine removal (as already noted above), but also decreases reaction time.

*Recovery of by-products.*—The by-product gases consist mostly of ammonia, carbon dioxide, water vapor, and vaporized ammonium fluosilicate. In case the phosphatic material contains sulfate, traces of sulfides may be detected by odor.

Figure 3 is a diagrammatic representation of a by-product recovery system particularly adapted to meeting the problems involved in this process.

Element 21 is the previously mentioned by-product recovery line, which leads into cyclone separator 28. There, at a temperature in the range of about 100° to about 180° C., ammonium fluosilicate is separated out. It is collected in the bottom of cyclone separator 28, and allowed to drop out through line 29 to conveyor 30 which carries the substantially anhydrous material to storage hopper 31. It is desirable to maintain this material in an anhydrous state due to the fact that it hydrolyzes and decomposes in the presence of water.

The remaining gases and water vapor are led from the top of the cyclone separator 28 through line 32 into the bottom of scrubber tower 33. Scrubber tower 33 as shown contains a suitable number of bubble cap trays 34. It may contain instead any desirable type of conventional packing material such as Raschig rings, Berl saddles, or other well known gas liquid contact devices.

As indicated in Figure 3, the accumulated liquid in the bottom of tower 33 is led through line 35 to suction pump 36 and discharged through lines 37 and 38.

The products discharged from pump 36 are an aqua ammonia solution of approximately 20 to 26% $NH_4OH$, and varying amounts of carbon dioxide which are presumably present in the form of ammonium carbonate. The amount of carbon dioxide will vary depending on the source of the phosphatic material selected as one of the reactants. Any sulfide present will appear here as a contaminant.

A portion of the discharge of pump 36 is bypassed through line 37 and recirculated to the top of the tower as the scrubbing medium.

The scrubbed gases escape from the top of the tower through line 39. As shown, they are led from there to the suction of a squirrel cage blower 40, the discharge gases from which are led to the atmosphere through a suitable vent line 41.

In one form of this invention where a slight vacuum is used on line 21 as indicated in Figures 1 and 3, a portion of the vent gas discharged through line 41 is preferably led back to line 20 of Figures 1 and 3 to minimize the air leakage into the reactor and thus minimize possible decomposition of ammonia due to its reaction with the oxygen of the air.

It is obvious that the recovery system illustrated in Figure 3 is but one of the possible methods of recovery of the constituents of by-product recovery line 21.

The following examples will more particularly show the detailed practice of my invention, but are not to be considered as limiting.

Example 1

30 grams of crystalline monoammonium phosphate were mixed with 25 grams of 300 mesh Florida phosphate rock in a small porcelain evaporating dish. Approximately 10 cc. of water was added to the mixture to form a paste and insure wetting of the rock with the soluble phosphate. The water was then evaporated at a low temperature. The dried mixture was placed in an oven held at 343° C. for one hour and thirty-nine minutes. The resulting reaction mass weighed 45.0 grams, which indicated a weight loss of 18.2%. The product was in the form of a spongy, porous, gray, dry, friable mass which had the following partial analysis by weight:

| | Percent |
|---|---|
| Total $P_2O_5$ | 59.40 |
| $H_2O$ soluble $P_2O_5$ | 17.70 |
| Citrate insoluble $P_2O_5$ | 1.14 |
| Nitrogen | 2.85 |
| Fluorine | .45 |

From the weights and analysis it was indicated that 94.2% of the citrate insoluble phosphorus originally present in the rock was converted to the citrate soluble form. 78% of the fluorine and 65.2% of the ammonia originally in the material were driven off as gases.

Example 2

50 grams of finely ground Florida phosphate rock were mixed with 102 grams of monoammonium phosphate in a small porcelain evaporating dish. The mixture was heated within the range 204° to 210° C. for two hours in an electric muffle. When removed from the furnace, the mass was in a pasty condition and weighed 144.5 grams. This indicated a weight loss of approximately 4.95%. The fusion mass had the following partial analysis by weight:

| | Percent |
|---|---|
| Total $P_2O_5$ | 56.28 |
| $H_2O$ soluble $P_2O_5$ | 41.12 |
| Citrate insoluble $P_2O_5$ | 8.65 |

From the weight and analysis, it was indicated that 28.8% of the citrate insoluble phosphorus originally in the rock was converted to the citrate soluble form.

Example 3

In this example 300 mesh phosphate rock was calcined in an oxidizing atmosphere at 1800° F. for approximately 30 minutes with occasional stirring. 20 grams of the resulting calcined rock was mixed with 48 grams of $NH_4H_2PO_4$ and placed in a beaker which was partially submerged in a lead-tin alloy bath. The bath temperature was maintained within a temperature range of 340° C. to 365° C. After approximately 12 minutes, the fusion mass changed from a liquid to a gummy rubberlike solid. The mass was allowed to remain in the lead bath for an additional 12 minutes, until it became dry and friable enough to grind. The material was then removed from the beaker and ground to pass an 80 mesh sieve. The ground material was placed in an electric oven and baked for three hours at 350°. At the end of the bake period the mass weighed 53.1 grams, indicating a weight loss of approximately 22%. The finished material had the following partial analysis by weight:

| | Percent |
|---|---|
| Total $P_2O_5$ | 69.54 |
| Citrate insoluble $P_2O_5$ | 3.43 |
| CaO | 19.55 |
| Nitrogen | 4.81 |
| Fluorine | .07 |

From the residue weight and analysis, it was indicated that 74.73% of the citrate insoluble phosphorus contained in the rock was converted to citrate soluble form and 94.33% of its fluorine was removed. Of the ammonia added as monoammonium phosphate, 64.08% was driven off as gaseous ammonia and ammonium fluosilicate.

Example 4

10 grams of finely ground raw phosphate rock were mixed with 25 grams of crystalline monoammonium phosphate, and placed in a beaker which was partially submerged in a molten lead bath heated to 350° C. The fluid mass was stirred with a glass rod until it became solid, which required approximately 10 minutes. The heating was continued for an additional 15 minutes, until the material became dry and friable. It was then removed from the beaker, cooled and ground to pass an 80 mesh sieve. The ground mass was then baked for three hours at 350° C. After baking the residue weighed 27.6 grams, indicating a weight loss of 21.1%. A partial analysis of the baked material by weight was as follows:

| | Percent |
|---|---|
| Total $P_2O_5$ | 68.64 |
| Citrate insoluble $P_2O_5$ | .52 |
| Nitrogen | 4.20 |
| Fluorine | .10 |
| CaO | 19.15 |

In this example 61.89% of the ammonia contained in the initial monoammonium phosphate was driven off. 92.1% of the fluorine contained in the rock was removed, and the conversion of the citrate insoluble phosphorus to citrate soluble phosphates was 95.1%.

Example 5

27 grams of monoammonium phosphate and 10 grams of ground phosphate rock were reacted at 350° until the mass became dry and friable (approximately 25 minutes). The mass was removed from the container and ground to pass an 80 mesh sieve. It was then baked for three hours at 350° C. The weight loss after the reaction was 23.65%. The finished material had the following partial analysis by weight:

| | Percent |
|---|---|
| Total $P_2O_5$ | 71.47 |
| Citrate insoluble $P_2O_5$ | .57 |
| $NH_3$ | 5.01 |
| Fluorine | .02 |
| CaO | 17.41 |

The conversion of citrate insoluble phosphorus to the citrate soluble form amounted to 95.4%, and the removal of fluorine was 98.2% of the initial fluorine contained in the rock.

Example 6

10 grams of 300 mesh Florida phosphate rock were mixed with 30 grams of monoammonium phosphate and the mixture heated at 350° C. for approximately 30 minutes. The solidified mass was then ground to pass an 80 mesh sieve, and placed in an oven and heated to 350° C. for an additional three hours. After baking, the weight loss was 23.2% of the original charge. The mass was in a dry, porous, friable condition and had the following partial analysis by weight:

| | Percent |
|---|---|
| Total $P_2O_5$ | 71.70 |
| Citrate insoluble $P_2O_5$ | .77 |
| $NH_3$ | 5.19 |
| Fluorine | .016 |
| CaO | 16.00 |

From the weight and analysis it was indicated that 93.23% of the citrate insoluble phosphorus originally in the rock was converted to the citrate soluble form, and that 98.55% of the fluorine was also removed.

*Example 7*

Monoammonium phosphate and phosphate rock in a weight ratio of 2.7 to 1 (54 grams of monoammonium phosphate and 20 grams of rock) were reacted in a distilling flask at 350° C. for two hours. The gases driven off were condensed in a methanol-Dry Ice trap. Noncondensable gases were collected in a burette by displacing butyl phthalate. The volume of non-condensables was 16.7 cc. (average of 2 runs) which was considered negligible and indicated little or no dissociation of ammonia. A white product was deposited in the neck of the reaction flask. This was identified as ammonium fluosilicate, $(NH_4)_2SiF_6$, and was approximately 5.5% of the initial rock weight. Total weight recovery (condensable gases plus fusion mass) was 99.8% and 100.1%, respectively, for two runs. Material balances for these two runs were as follows:

| Material | Percent in Residue | | Percent in Neck Residue | | Percent in Condensate | | Percent loss or gain | |
|---|---|---|---|---|---|---|---|---|
| | Exp. 5 | Exp. 6 | Exp. 5 | Exp. 6 | Exp. 5 | Exp. 6 | Exp. 5 | Exp. 6 |
| Total $P_2O_5$ | 100.1 | 98.7 | | | | | +.10 | −1.3 |
| $NH_3$ | 48.7 | 47.6 | 2.0 | 1.6 | 43.7 | 45.3 | −5.6 | −5.5 |
| Fluorine | 5.9 | 10.3 | 69.9 | 61.1 | 30.2 | 29.4 | +6.0 | −0.8 |
| CaO | 106.9 | 108.3 | | | | | +6.9 | +8.3 |
| $CO_2$ | | | | | 103.7 | 102.3 | +3.7 | +2.3 |
| $SiO_2$ | 78.4 | 75.2 | 8.8 | 8.8 | 0.3 | 0.8 | −12.5 | −15.2 |

*Example 8*

50 grams of previously reacted and ground reaction mass, derived by heating 2.7 parts of monoammonium phosphate mixed with one part of phosphate rock, was placed in a 100 cc. stainless steel beaker equipped with a stainless steel agitator. While under agitation, the mass was heated to 350° by means of an electric heating mantle surrounding the beaker. A mixture of monoammonium phosphate and phosphate rock with a weight ratio of 2.7 to 1 was fed into the hot mass at the rate of one gram per minute, while the temperature was held constant at 350° C. White fumes smelling strongly of ammonia were observed coming off the mass. 150 grams of fresh charge were added to the agitated mass over a period of 150 minutes, and there was no indication of stickiness or balling within the mass. Upon removal from the reactor, the mass was in a granular free flowing condition. There was no evidence of attack on the stainless steel.

*Example 9*

Reaction of monoammonium phosphate and raw ground phosphate rock for one hour in a heated beaker without agitation in a ratio of 92 pounds of monoammonium phosphate to 100 pounds of rock gave the following results:

| | Lbs. Rock | Lbs. monoammonium phosphate | Temp., °C. | Percent Initial F Removed | Percent Total $P_2O_5$ | Percent Citrate Insol. $P_2O_5$ |
|---|---|---|---|---|---|---|
| A | 100 | 92 | 300 | 39.0 | | |
| B | 100 | 92 | 600 | 69.1 | 58.9 | 15.00 |
| C | 100 | 92 | 800 | 81.0 | 59.06 | 26.56 |

*Example 10*

A dark colored phosphate rock, containing approximately 14.6% and a substantial quantity of organic matter, was used in this example. Twenty grams of the rock (300 mesh) was mixed with 54 grams of crystalline monoammonium phosphate. The mixture was heated for approximately 25 minutes at 350° C. The dry, dark colored mass was then ground to pass an 80 mesh sieve and heated at 350° C. for an additional three hours. The residue showed a weight loss of 25.19% and had the following partial analysis by weight:

| | Percent |
|---|---|
| Total $P_2O_5$ | 66.26 |
| Citrate insoluble $P_2O_5$ | .71 |
| $NH_3$ | 4.82 |
| Fluorine | .06 |

This indicated that 94.0% of the citrate insoluble phosphorus originally present in the rock was converted to the citrate soluble form. 95.5% of the fluorine and 67.6% of the ammonia added as rock and monoammonium phosphate, respectively, were driven off.

*Example 11*

35.74 grams of mono-sodium phosphate mono-hydrate was mixed with 10 grams of Florida rock, and the mixture was heated for two hours at 300° C. At the end of this time, the residue was of a light gray color and weighed 38.91 grams, indicating a weight loss of approximately 14.9%. The residue analyzed as follows:

| | Percent |
|---|---|
| Total $P_2O_5$ | 56.95 |
| Citrate insoluble $P_2O_5$ | 4.11 |
| Fluorine | 1.12 |
| CaO | 12.82 |

From the weight of residue and its analysis, it was indicated that 54.3% of the citrate insoluble phosphorus of the rock was converted to citrate soluble form. All of the fluorine contained in the rock remained in the residue.

This invention has been described primarily in terms of the reaction of raw phosphate rock and monoammonium phosphate. However, it is readily apparent that other phosphatic materials (including all those referred to at the beginning of this application) may be used as suitable raw materials with only minor changes in the description of the process I have given.

The invention has also been described primarily in terms of monoammonium phosphate. However, diammonium phosphate and even unstable triammonium phosphate could be used as a reactant—but at obviously higher cost, with more aqua ammonia by-product produced, and with no corresponding gain in conversions. Likewise, a partially deammoniated monoammonium phosphate could be employed, but at little or no advantage. Thus I prefer to use monoammonium phosphate as a reactant.

The last example above relates to mono-sodium phosphate mono-hydrate. In addition, other mono-basic alkali metal phosphates may be employed as reactants.

It is seen that this invention is extremely flexible both as to suitable raw materials, and as to end products suitable for animal feed supplement use, as intermediates in the production of fertilizers, or even as fertilizers for direct application.

The above detailed description has been given for clearness of understanding only. No unnecessary limitations should be understood therefrom, as modifications will be obvious to those skilled in the art.

I claim:

1. The process of reacting monoammonium phosphate containing about 61.8 parts by weight $P_2O_5$ per 100 parts by weight of pure monoammonium phosphate with raw phosphate rock containing up to about 35 parts by weight $P_2O_5$ per 100 parts by weight of raw rock in a monoammonium phosphate to raw rock ratio in the range of about 1.77 to 1 to 5.1 to 1 on one part by weight of contained $P_2O_5$ basis at a temperature in the range of above 200° C. to about 400° C. and a pressure of about one atmosphere absolute to produce a reaction mass containing more citrate soluble $P_2O_5$ than that introduced by the monoammonium phosphate.

2. The process of reacting an ammonium phosphate with a phosphatic material selected from the group consisting of raw phosphate rocks, aluminum phosphate, iron phosphate, ferro-aluminum phosphate complexes, fused phosphate rocks, calcined phosphate rocks and heat modified phosphate rocks at a temperature in the range of above 200° C. to about 400° C. and a pressure of about one atmosphere absolute to produce a reaction mass containing from about 55% to 70% $P_2O_5$ by weight and no more than about 0.1% fluorine by weight, and further characterized in that at least a portion of said $P_2O_5$ content is citrate soluble.

References Cited in the file of this patent

UNITED STATES PATENTS

| | | |
|---|---|---|
| 1,103,910 | Wilson et al. | July 14, 1914 |
| 1,251,742 | Blumenberg | Jan. 1, 1918 |
| 1,517,687 | Voerkelius | Dec. 2, 1924 |
| 1,591,271 | Blumenberg | July 6, 1926 |
| 1,768,075 | Kipper | June 24, 1930 |
| 1,866,564 | Hansen | July 12, 1932 |
| 1,931,819 | Hecht | Oct. 24, 1933 |
| 1,965,301 | Tramm | July 3, 1934 |
| 2,092,123 | Kaselitz | Sept. 7, 1937 |
| 2,337,491 | Perrin et al. | Dec. 21, 1943 |